United States Patent [19]

Patterson et al.

[11] Patent Number: 5,607,563
[45] Date of Patent: Mar. 4, 1997

[54] SYSTEM FOR ELECTROLYSIS

[76] Inventors: James A. Patterson, 2074 20th St., Sarasota, Fla. 34234; Dennis Cravens, 382 Highway 244, Cloudcroft, N.M. 88317

[21] Appl. No.: 566,547

[22] Filed: Dec. 4, 1995

[51] Int. Cl.⁶ .............................. C25B 9/00; C25B 11/02; C25B 11/04
[52] U.S. Cl. .................. 204/269; 204/275; 204/284; 204/290 R; 204/290 F
[58] Field of Search ...................................... 204/275, 273, 204/222, 284, 269

[56] References Cited

U.S. PATENT DOCUMENTS

| | | |
|---|---|---|
| 3,632,496 | 1/1972 | Patterson . |
| 3,888,756 | 6/1975 | Teshima et al. . |
| 4,269,689 | 5/1981 | Agladze . |
| 4,316,786 | 2/1982 | Yu et al. . |
| 4,913,779 | 4/1990 | Lacoste . |
| 4,943,355 | 7/1990 | Patterson . |
| 5,036,031 | 7/1991 | Patterson . |
| 5,318,675 | 6/1994 | Patterson . |
| 5,372,688 | 12/1994 | Patterson . |

*Primary Examiner*—Donald R. Valentine
*Attorney, Agent, or Firm*—Charles J. Prescott

[57] ABSTRACT

An electrolytic cell and system for electrolysizing and/or heating a liquid electrolyte containing water having a conductive salt in solution flowing through the cell. The electrolytic cell includes a non-conductive housing having an inlet and an outlet and spaced apart first and second conductive foraminous grids connected within the housing. A plurality of spaced beds of closely packed conductive microspheres are positioned end to end within the housing in electrical contact with the first grid adjacent the inlet. The individual microsphere beds are electrically isolated from one another in the absence of the liquid electrolyte. The microspheres are generally uniform in size and density and include a plated layer formed of metallic hydride which is readily combineable with hydrogen or an isotope of hydrogen with hydrazine to form a conductive, preferably flash coated metal layer. An electric power source in the system is operably connected across the first and second grids whereby electrical current flows between the grids within the liquid electrolyte.

16 Claims, 2 Drawing Sheets

SYSTEM FOR ELECTROLYSIS

BACKGROUND OF THE INVENTION

1. Scope of Invention

This invention generally relates to electrolytic cells, and more particularly to an improved electrolytic cell for electrolysis of water and the production of useful amounts of heat.

2. Prior Art

The present invention utilizes and improves upon microspheres formed of non-metallic beads which are plated with a uniformly thick coating of palladium. These palladium coated microspheres are taught in my previous U.S. Pat. Nos. 4,943,355 ('355) and 5,036,031 ('031). In these above-recited previous patents, cross linked polymer microspheres having a plating of palladium are taught to exhibit improvements in the absorption of hydrogen and isotopes of hydrogen. Utilizing these catalytic microspheres led to my later U.S. Pat. Nos. 5,318,675 ('675) and 5,372,688 ('688) (incorporated herein by reference) which teach an electrolytic cell and system for, inter alia, producing heat The use of a palladium sheet to form one electrode within an electrolytic cell to produce excess heat, the electrolytic cell being a Pons-Fleischmann-type is taught by Edmund Storms. The description of the Storms electrolytic cell and his experimental performance results are described in an article entitled *Measurements of Excess Heat from a Pons-Fleischmann-Type Electrolytic Cell Using Palladium Sheet* appearing in Fusion Technology, Volume 3, March 1993. In a previous article, Storms reviewed experimental observations about electrolytic cells for producing heat in an article entitled "Review of Experimental Observations About the Cold Fusion Effect" FUSION TECHNOLOGY, Vol. 20, December 1991.

None of the previously reported experimental results or other prior art devices known to applicant other than my U.S. '675 and '688 patents have utilized or disclosed non-conductive copolymeric beads of palladium coated (or any substitute metal which will form "metallic hydrides" in the presence of hydrogen) conductive microspheres within an electrolytic cell for the production of heat and the electrolysis of water into its hydrogen and oxygen components. The present invention discloses the use of the '355 and '031 microspheres and various improved embodiments of preferably palladium/nickel coated microspheres within an improved electrolytic cell in conjunction with an electrolytic media containing either water or heavy water, particularly deuterium. These improved microspheres are the subject of my co-pending U.S. application entitled "Improved Uniformly Plated Microsphere Catalyst, Ser. No. 08/462,005, filed Jun. 5, 1995 ("co-pending U.S. application"). The improved electrolytic cell utilizes a plurality of subcells within one housing arranged in series to each subcell contributes to increased efficiency of the next-in-line subcell.

BRIEF SUMMARY OF THE INVENTION

An electrolytic cell and system for electrolysizing and/or heating a liquid electrolyte containing water having a conductive salt in solution flowing through the cell. The electrolytic cell includes a non-conductive housing having an inlet and an outlet and spaced apart first and second conductive foraminous grids connected within the housing. A plurality of spaced beds of closely packed conductive microspheres which form individual subcells in series are positioned end to end within the housing in electrical contact with the first grid adjacent the inlet. The individual microsphere beds are electrically isolated from one another in the absence of the liquid electrolyte. The microspheres are generally uniform in size and density and include a plated layer formed of metallic hydride which is readily combineable with hydrogen or an isotope of hydrogen with hydrazine to form a conductive, preferably flash coated metal layer. An electric power source in the system is operably connected across the first and second grids whereby electrical current flows between the grids within the liquid electrolyte.

It is therefore an object of this invention to utilize any one of the preferably palladium coated microspheres such as previously disclosed in my '675 and '688 patents and the multi-layer arrangement of my referenced co-pending U.S. application Ser. No. 08/462,005 in conjunction with an improved multi-bed bed electrolytic cell, for the production of either hydrogen and oxygen and/or heat.

It is yet another object of this invention to provide an improved electrolytic cell for the increased production of heat in the form of heated water or heavy water-based electrolyte exiting the cell after being heated therein.

It is yet another object of this invention to utilize metal coated conductive microspheres in an improved electrolytic cell, the metal chosen from those which exhibit strong hydrogen absorption properties to form "metallic hydrides" and structurally supported by one or more adjacent uniform support plates.

In accordance with these and other objects which will become apparent hereinafter, the instant invention will now be described with reference to the accompanying drawings.

DETAILED DESCRIPTION OF THE INVENTION

Figure 1:
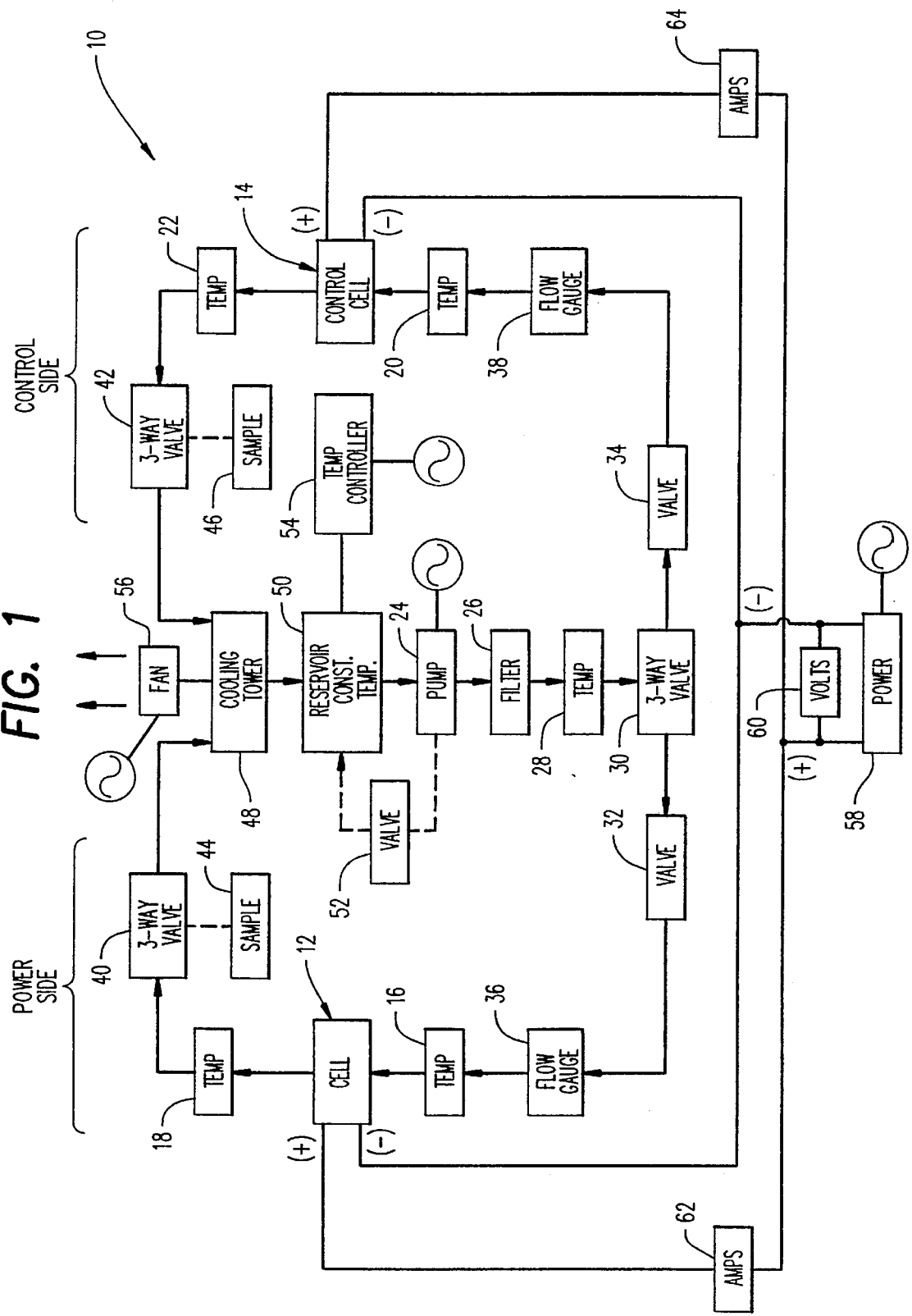
FIG. 1 is a schematic view of an experimental system embodying the present invention operating simultaneously in parallel with a control system for comparison.

Referring now to the drawings, an experimental or test system embodying the concepts of the present invention which was utilized during testing procedures is shown generally at numeral 10 and includes an electrolytic cell shown generally at numeral 12 described in detail herebelow. The experimental system 10 is generally comprised of a power side including electrolytic cell 12 and a control side including a control cell shown generally at 14. This control cell 14 is identical in structure with respect to electrolytic cell 12 described herebelow, except that the conductive beads utilized in the control cell are formed from solid spherically shaped tin shot of about twenty to forty mesh in diameter.

Figure 2:
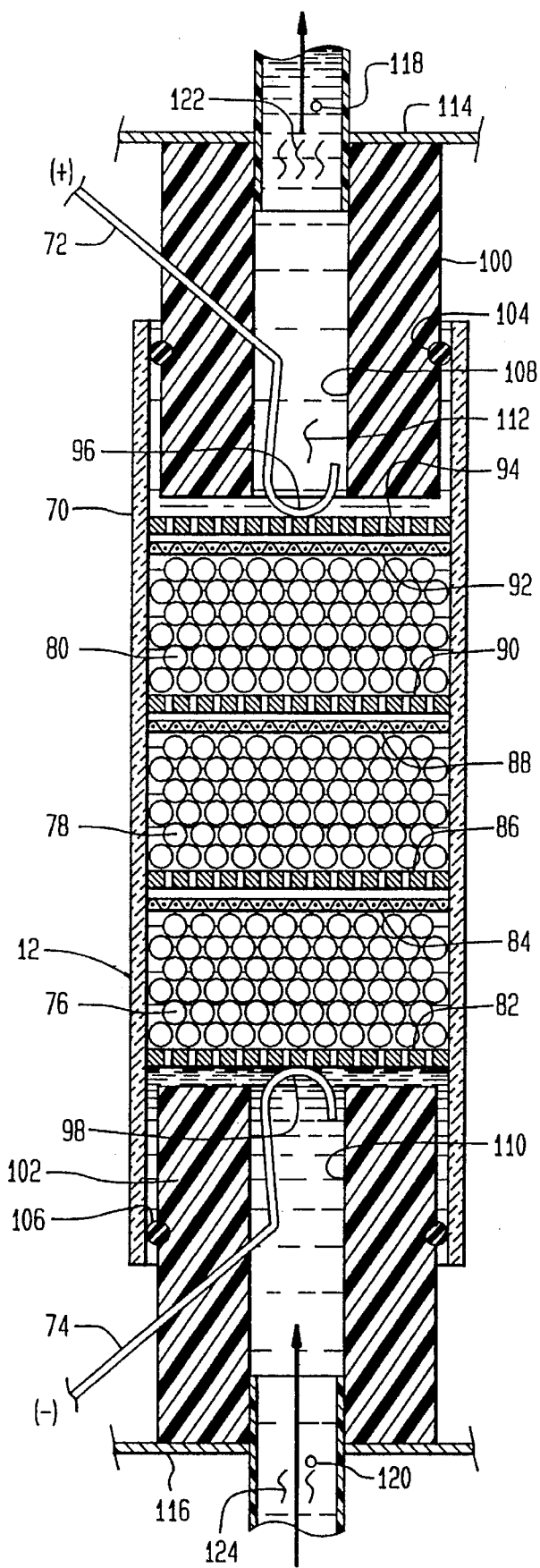
FIG. 2 is a section view of the electrolytic cell shown in FIG. 1.

This experimental system 10 is closed loop in circulation wherein an electrolyte 112 in FIG. 2 is pumped from a reservoir 50 by pump 24 through filter 26 to a three-way valve 30, from which the electrolyte 112 then flows through open valves 32 and 34 and through flow gauges 36 and 38 respectively. The liquid electrolyte temperature is measured at 28 flowing from the reservoir 50 and also measured at 16 as the electrolyte enters electrolytic cell 12 and at 20 as the liquid electrolyte enters the control cell 14.

After the electrolytic cell 12 and the control cell 14 are completely filled with the liquid electrolyte 112, the fluid then begins to exit from each cell through the corresponding outlet tube and into three-way valves 40 and 42, respectively. Liquid electrolyte outlet temperatures are measured at 18 and 22 with respect to the electrolytic cell 12 and the control cell 14, respectively. Electrolyte samples may be withdrawn at 44 and 46 as desired to confirm composition.

The steady state flowing liquid electrolyte 112 is returned to the reservoir 50 via a cooling tower 48 from each of the three-way valves 40 and 42. A cooling fan 56 positioned above the cooling tower removes excess heat upwardly in the direction of the arrows from the fan 56.

A source of d.c. power 58, whose output voltage is monitored at 60 provides electrical power to both the electrolytic cell 12 and the control cell 14. Both the output voltage at 60 and current flow at 62 and 64 are carefully monitored so as to ensure that both the power side and the control side of this experimental system 10 are maintained identical. Likewise, flow gauges 36 and 38 serve to ensure that electrolytic flow into each of the cells 12 and 14 are identical one to another. A bypass valve 52 serves as an auxiliary means for total volumetric flow control of the liquid electrolyte from pump 24.

In FIG. 2, the details of the electrolytic cell 12 utilized during testing procedures is there shown. Again, the structure of control cell 14 is identical to that of electrolytic cell 12 except for the microsphere makeup. A cylindrical LUCITE non-conductive housing 70, open at each end, includes moveable non-conductive end members or stoppers 100 and 102 at each end thereof. These end members 100 and 102 are sealed within the housing 70 by O-rings or TEFLON tape 104 and 106. The relative spacing between these end members 100 and 102 is controlled by the forceful movement of end plates 114 and 116 thereagainst.

These end members 100 and 102 also include a fluid chamber 108 and 110, respectively, within which are mounted electrodes 72 and 74, respectively, which extend from these chambers 108 and 110 to the exterior of the electrolytic cell 12 for interconnection to the d.c. power supply 58 in FIG. 1 having its negative and positive terminals connected as shown. This d.c. power supply 58 is preferably a constant current or voltage type. Positioned within inlet and outlet tubes are thermocouples 120 and 118 for monitoring the electrolyte temperature at these points of inlet and outlet of the electrolytic cell 12. In-line static mixers 122 and 124 are positioned in the electrolyte flow just upstream of thermocouples 118 and 120, respectively, to insure sensing of true average temperature of the electrolyte at those outlet and inlet points.

The curved end of electrode 74 is in electrical contact at 98 with a conductive foraminous grid 82 preferably formed of platinum or nickel positioned transversely across the housing 70 adjacent end member 102 while the curved end of electrode 16 is in electrical contact at 96 with another conductive foraminous grid 94 similarly formed and positioned adjacent end member 100 as shown. By this arrangement, when there is no electrolyte within the electrolytic cell 12, no current will flow between the electrodes 72 and 74.

A plurality of beds of closely packed conductive microspheres 76, 78 and 80 are positioned end-to-end or in stacked arrangements within housing 70, one end of microsphere bed 76 being positioned immediately adjacent and against conductive grid 82. These individual conductive microspheres of each bed 76, 78 and 80 are formed of a non-conductive inner polymer beads and include a uniform palladium plating layer. The preferred size of these conductive microspheres are in the range of 1.0 mm or less in diameter and the details of the manufacture of these conductive microspheres are generally taught in my previous U.S. Pat. Nos. 4,943,355 and 5,036,031. My co-pending U.S. application Ser. No. 08/462,005, filed on Jun. 5, 1995, entitled "Uniformly Plated Microsphere Catalyst", incorporated herein by reference, discloses the broad details of various improved embodiments of these conductive microspheres. These improved conductive microspheres preferably include an inner nickel plate atop a metallic flash coat, a preferably palladium plate atop the inner nickel plate, and a support plate atop the palladium, preferably nickel.

In the previously reported testing in U.S. '675 and '688, an intermediate layer of nickel was alternately added over a copper flash coat beneath the palladium plate. The nickel intermediate layer, producing a mean microsphere density of 1.51 g/cm$^3$, was positioned immediately beneath the palladium plated layer to increase the density of the conductive microspheres. In this testing, a black residue developed within the liquid electrolyte which was subsequently analyzed and determined to be palladium. Further investigation showed that the outer palladium coat of these previous original microspheres, being subjected to both a heat and electrical current duty cycle, either flaked, spalled and/or incurred minor cracking of the palladium plate. This in-service deterioration both shortened the useful life of the previously described cell and its efficiency in producing heat.

Still referring to FIG. 2, a non-conducive foraminous nylon screens or mesh 84, 88 and 92 are each positioned against one end of each bed 76, 78 and 80 of these conductive microspheres so as to retain them in the position shown and to electrically and physically isolate the individual beds or subcells 76, 78 and 80 one from another absent the presence of the liquid electrolyte 112. Against the other end surface of each bed 76, 78 and 80 is positioned in contact with the corresponding conductive foraminous grid 82, 86 and 90 positioned transversely across the housing 70 as shown.

ELECTROLYTE

When the electrolytic cell 12 is filled with a liquid electrolyte 112, current will flow from the power supply 58 between the electrodes 74 and 72 and between identical electrodes within the control cell 14. The preferred formulation for this electrolyte 112 is generally that of a conductive salt in solution with water. The preferred embodiment of water is that of either light water ($H_2^1O$) or heavy water and more specifically that of deuterium ($H_2^2O$) and their mixtures. The water ($H_2^1O$) and the deuterium ($H_2^2O$) is preferred to have a minimum resistance of one megohm with a turbidity of less than 0.2 n.t.u. This turbidity is controlled by ultra membrane filtration. The preferred salt solution is lithium sulfate ($Li_2SO_4$) in a 1-molar mixture with water and is of chemically pure quality. In general, although a lithium sulfate is preferred, other conductive salts chosen from the group supplying ions of boron, aluminum, potassium, gallium, and thallium, as well as lithium, may be utilized. The preferred pH or acidity of the electrolyte is 9.0.

CONDUCTIVE BEADS

Palladium coated microspheres were originally preferred as disclosed in U.S. Patents '675 and '688. However, palladium may be substituted by other transition metals, rare earths and also uranium. In general, any of these metals which are capable of combining with high volumes of hydrogen to form "metallic hydrides" are acceptable. These metals known to applicant which will serve as a substitute for palladium are lanthanum, praseodymium, cerium, titanium, zirconium, vanadium, tantalum, uranium, hafnium, thorium and their alloys. Authority for the inclusion of these elements within this group is found in a book entitled *"Inorganic Hydrides"*, by B. L. Shaw, published by Pergammon Press, 1967. However, palladium is the best known and most widely studied metallic hydride and was utilized in my previously referenced patents to form conductive hydrogen-absorbing microspheres. In an even more general sense, the broad requirement here is to provide a "metallic hydride" surface, the makeup of the core of the microspheres being a secondary consideration.

The specific composition of the conductive electrolyte beads utilized in the electrolytic cell and experiment reported herebelow is as follows:

Core: 0.9±0.1 mm diameter cross linked styrene divinyl benzene polymer sphere;

1st layer: copper flash 50–200 A° thick

2nd layer: base nickel layer—electroless deposited 0.5–2.0 mm. thick

3rd layer: palladium layer—electroless deposited 0.7–1.6 mm thick

4th layer: outer nickel layer—electroless deposited 0.3–0.8 mm thick

CELL RESISTANCE

In preparing the electrolytic cells for testing, the cell resistance utilizing a volt ohm meter was utilized prior to the introduction of the electrolyte into the electrolytic cell. This cell resistance, when dry, should be infinitely high. Otherwise, a short between the anode screen and the cathode beads exists and the unit would have to be repacked. Prior to testing, with electrolyte present, the cell resistance was set below 100 ohms by appropriate compression of the end members.

EXPERIMENTAL RESULTS

Utilizing the experimental arrangement described with respect to FIG. 1 and incorporating therein the electrolytic cell 12 detailed in FIG. 2, the testing procedure was single stage wherein parameters of liquid electrolyte flow and input voltage and current were carefully monitored and controlled while the liquid electrolyte temperatures were monitored carefully at the inlets and outlets of each of the cells 12 and 14. The data described herebelow in Table I was taken after approximately two hours of steady state or constant operating conditions of the system and each cell 12 and 14.

Described in Table I are data related to each of the cells 12 and 14 in the form of electrolytic flow rate in milliliters (ml) per minute (min.), electrolyte inlet temperature (T in), liquid electrolyte outlet temperature (T out), voltage (V) across each of the cells 12 and 14, and electrical current flow (amps) across each cell 12 and 14.

This above data was processed to determine the temperature change (ΔT°C.) across each cell 12 and 14 in steady state conditions. Additionally, the wattage input (W in) for each cell was calculated as the product of voltage×amps across each cell 12 and 14. The output wattage (W out) was calculated as the product of electrolyte flow rate kilograms (kg) per minute×ΔT°C.×70. The percent (%) yield was calculated by dividing the output wattage (W out) by the input (W in)×100%.

Utilizing the above data and direct calculations described hereinabove, the uncorrected yield with respect to the electrolytic cell 12 was 10,079% or, viewed another way, the output wattage (W out) was approximately one hundred (100) times that of the input wattage (W in). The calculated yield with respect to the control cell 14 represented a net loss during the identical running conditions between the two cells 12 and 14.

CORRECTION FACTORS

HEAT LOSS CORRECTION

By designing the experimental system 10 in tandem or parallel with respect to the electrolytic cell 12 and the control cell 14, an excellent opportunity to establish a heat loss correction factor was provided. On the assumption that the control cell 14 produced no electrolysis and heating of the liquid electrolyte 112 did not occur within the control side and the control cell 14 of the experimental system 10, the temperature drop across the control cell 14 of 0.3° C. being viewed as radiant heat loss occurring from the liquid electrolyte flowing into this control cell at an inlet temperature of 35.2° C. Taking the ratio of [T in÷T out] with respect to the control cell 14, and multiplying this as a heat loss correction factor equaling 1.0086 by the outlet temperature of the liquid electrolyte of the electrolytic cell 12 (40.8° C.), a corrected liquid electrolyte outlet temperature for the electrolytic cell 12 would be 41.2° C.

Using this corrected electrolyte outlet temperature (T out) of 41.2° C. for the electrolytic cell 12 provides the revised or corrected ΔT of the electrolyte of 5.8° C. for the electrolytic cell 12. Revising the wattage output calculation as above described utilizing this corrected ΔT° of 5.8° C. instead of 5.4° C. provides a corrected wattage output of 260 watts (W out). The revised yield using this temperature correction factor would be the ratio of 260 watts (W out)÷2.4 watts (W in)×100%=10,833% yield.

ELECTROLYSIS CORRECTION

With respect to the electrolytic cell 12, electrolysis is occurring wherein the electrolyte 112 is being reduced into

TABLE I

| | DATA | | | | | CALCULATIONS | | | |
|---|---|---|---|---|---|---|---|---|---|
| Cell | Electrolyte Flow Rate (ml per min) | Inlet Temp (T in) | Outlet Temp (T out) | Voltage (V) | Current (Amps) | Δ T (T out − T in) | Watts In (W in) | Watts Out (W out) | % Yield (W out − W in) |
| Control Cell (14) | 640 | 35.2° C. | 34.9° C. | 5.0 | 0.49 | (−)0.3° C. | 2.45 | (−)13.4 | Heat Loss |
| Electrolytic Cell (12) | 640 | 35.4° | 40.8° C. | 5.0 | 0.48 | +5.4° C. | 2.40 | 241.9 | 10,079% |

$H^2$ and $O^2$. It is well known that approximately 1.5 volts d.c. is required to accomplish this in a liquid electrolyte. Therefore, the net voltage across electrolytic cell 12 utilized for electrolyte heating only, separate from electrolysis, may be determined to be the difference between the overall voltage across the cell 12 (5.0 V) reduced by the voltage requirement for electrolysis (1.5 V) for a net heating voltage of 3.5 V utilized for heating the electrolyte. Thus, the corrected wattage input is reduced to 1.7 watts (3.5 V×0.48 Amps). Recalculation for output yield of the electrolytic cell 12 utilizing the revised wattage of 260 watts (W out) provided by the corrected wattage input of 1.7 (W in)×100% produces a further revised yield calculation of 15,294% yield.

In a still further attempt to be more accurate with respect to the true yield calculation, the preferred embodiment of the electrolytic cell 12 shown in FIG. 2 includes a stacked or series array of three separate beds 76, 78 and 80 of electrolytic cells as previously described. These may be viewed as being three separate beds or subcells each having 1.67 volts applied thereacross (5.0 V÷3). Assuming 100% electrolysis of the liquid electrolyte across each of the subcells requiring 1.5 volts (theoretical) to effect this complete electrolysis, the net voltage across each of the three beds 76, 78, and 80 is reduced by 1.5 V to 0.167 V available for heating only of the electrolyte 112 as it passes through the cell 12. The wattage calculation based upon this further revised voltage across each of the separate bead beds 76, 78, and 80 produces a net input wattage (W in) of 0.240 watts (3 cells×0.167 watts× 0.48 amps). Again, revising the yield calculation as described above produces a net yield for the electrolytic cell under the experimental conditions shown in Table I to equal 108, 120% yield (260 W out÷0.240 W in×100%).

This new cell 12 is therefore viewed in one aspect as several individual beds of conductive microspheres or subcells arranged in series. By placing each of these individual subcells within a single housing, the anode of one bead bed becomes the cathode for the next in downstream series. By separating each of the individual bead beds within the system 12 by the porous non-conducting membrane or mesh 84, 88, and 92, electrolysis and heating of the electrolyte takes place beneath or upstream of the respective next in line bead bed thus exposing the electrolyte to the H+ions. Thus, each upstream cell or subcell within the electrolytic cell 12 preheats the electrolyte flowing into the next subcell. The net yield is therefore substantially greater than if only a single cell element were utilized as in the previous '675 and '688 patents.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A system for electrolysis and heating of a liquid electrolyte comprising:

an electrolytic cell including a non-conductive housing and an inlet and an outlet;

a first conductive foraminous grid positioned within said housing adjacent to said inlet;

a second conductive foraminous grid positioned within said housing spaced from said first conductive grid and adjacent to said outlet;

a plurality of beds of closely packed conductive microspheres positioned within said housing and extending between said first and second conductive grids in a spaced apart end-to-end arrangement;

each bed of conductive microspheres separated one from another by a foraminous non-conductive mesh disposed across one end thereof and another conductive foraminous grid disposed across another end of each said bed of conductive microspheres;

each of the microspheres of substantially uniform size and density and including:
a conductive metal flash coating of uniform thickness formed by chemical combination with a cation exchange surface of a spherical cross-linked polymer microbead from a metal cation which will chemically reduce with hydrazine;
a metallic hydride forming layer of uniform thickness formed atop said flash coating, said metallic hydride forming layer combining with hydrogen or an isotope of hydrogen during operation to form a metallic hydride;
a metallic support layer of uniform thickness formed atop said metallic hydride forming layer, said support layer having a relatively high hydrogen diffusion rate and a relatively low hydride formation ratio;
means for pumping said liquid electrolyte into said electrolytic cell through said inlet, said electrolyte having a conductive salt in solution with water, said electrolyte exiting from said electrolytic cell through said outlet;
an electric power source having terminals operably connected to said first and second grids.

2. A system as set forth in claim 1, wherein:

said metallic hydride forming layer is taken from the group consisting of:

palladium, lanthanum, praseodymium, cerium, titanium, zirconium, vanadium, tantalum, uranium, hafnium and thorium.

3. A system as set forth in claim 1, wherein each said microsphere further includes:

a metallic stabilizer layer of uniform thickness formed atop said support layer, said stabilizer layer being a transition metal capable of a relatively high rate of hydrogen diffusion and a relatively low hydride formation ratio.

4. A system as set forth in claim 3, wherein:

said flash coating is taken from the group consisting of: copper, palladium, nickel and titanium;

said metallic hydride forming layer is taken from the group consisting of:
palladium, lanthanum, praseodymium, cerium, titanium, zirconium, vanadium, tantalum, uranium, hafnium and thorium;

said support layer is taken from the group consisting of: nickel, gold, silver and titanium; and said stabilizer layer is taken from the group consisting of: chromium, iron, cobalt and nickel.

5. An electrolytic cell comprising:

a non-conductive housing having an inlet and an outlet;

a first conductive foraminous grid positioned within said housing adjacent to said inlet;

a second conductive foreruinous grid positioned within said housing spaced from said first conductive grid and adjacent to said outlet;

a first plurality of conductive microspheres positioned within said housing in electrical communication with said first conductive grid at a first end thereof and having a first foraminous non-conductive mesh disposed across another end of said first plurality of conductive microspheres;

a second plurality of conductive microspheres positioned within said housing adjacent to said first plurality of conductive microspheres and having a third conductive foraminous grid positioned at one end thereof and which faces said first foraminous non-conductive mesh;

a second foraminous non-conductive mesh disposed across another end of said second plurality of conductive microspheres and which faces said second conductive foraminous grid;

said plurality of microspheres of substantially uniform size and density each microsphere including:

a conductive metal flash coating of uniform thickness formed by chemical combination with a cation exchange surface of a spherical cross-linked polymer microbead from a metal cation which will chemically reduce with hydrazine;

a metallic hydride forming layer of uniform thickness formed atop said flash coating, said metallic hydride forming layer combining with hydrogen or an isotope of hydrogen during operation to form a metallic hydride;

a metallic support layer of uniform thickness formed atop said metallic hydride forming layer, said support layer having a relatively high hydrogen diffusion rate and a relatively low hydride formation ratio.

6. An electrolytic cell as set forth in claim 5, wherein:

said metallic hydride forming layer is taken from the group consisting of:

palladium, lanthanum, praseodymium, cerium, titanium, zirconium, vanadium, tantalum, uranium, hafnium and thorium.

7. An electrolytic cell as set forth in claim 5, wherein each said microsphere further includes:

a metallic stabilizer layer of uniform thickness formed atop said support layer, said stabilizing layer being a transition metal capable of a relatively high rate of hydrogen diffusion and a relatively low hydride formation ratio.

8. An electrolytic cell as set forth in claim 7, wherein:

said flash coating is taken from the group consisting of: copper, palladium, nickel and titanium;

said metallic hydride forming layer is taken from the group consisting of:

palladium, lanthanum, praseodymium, cerium, titanium, zirconium, vanadium, tantalum, uranium, hafnium and thorium;

said support layer is taken from the group consisting of: nickel, gold, silver and titanium; and said stabilizer layer is taken from the group consisting of: chromium, iron, cobalt and nickel.

9. A system for producing useful excess heat in a liquid electrolyte comprising:

an electrolytic cell including a non-conductive housing and an inlet and an outlet;

a first conductive foraminous and positioned within said housing adjacent to said inlet;

a second conductive foraminous grid positioned within said housing spaced from said first conductive grid and adjacent to said outlet;

a first plurality of conductive microspheres positioned within said housing in electrical communication with said first conducive grid at a first end thereof and having a first foraminous non-conductive mesh disposed across another end of said first plurality of conductive microspheres;

a second plurality of conductive microspheres positioned within said housing adjacent to said first plurality of conductive microspheres and having a third conductive foraminous grid positioned at one end thereof and which faces said first foraminous non-conductive mesh;

a second foraminous non-conductive mesh disposed across another end of said second plurality of conductive microspheres and which faces said second conductive foraminous grid;

said plurality of microspheres each of substantially uniform size and density, each microsphere including:

a conducive metal flash coating of uniform thickness formed by chemical combination with a cation exchange surface of a spherical cross-linked polymer microbead from a metal cation which will chemically reduce with hydrazine;

a metallic hydride forming layer of uniform thickness formed atop said flash coating, said metallic hydride forming layer combining with hydrogen or an isotope of hydrogen during operation to form a metallic hydride;

a metallic support layer of uniform thickness formed atop said metallic hydride forming layer, said support layer having a relatively high hydrogen diffusion rate and a relatively low hydride formation ratio;

means for pumping said liquid electrolyte into said electrolytic cell through said inlet, said electrolyte having a conductive salt in solution with water, said electrolyte exiting from said electrolytic cell through said outlet;

an electric power source having terminals operably connected to said first and second grids.

10. A system as set forth in claim 9, wherein:

said metallic hydride forming layer is taken from the group consisting of:

palladium, lanthanum, praseodymium, cerium, titanium, zirconium, vanadium, tantalum, uranium, hafnium and thorium.

11. A system as set forth in claim 9, wherein each said microsphere further includes:

a metallic stabilizer layer of uniform thickness formed atop said support layer, said stabilizing layer being a transition metal capable of a relatively high rate of hydrogen diffusion and a relatively low hydride formation ratio.

12. A system as set forth in claim 11, wherein:

said flash coating is taken from the group consisting of: copper, palladium, nickel and titanium;

said metallic hydride forming layer is taken from the group consisting of:

palladium, lanthanum, praseodymium, cerium, titanium, zirconium, vanadium, tantalum, uranium, hafnium and thorium;

said support layer is taken from the group consisting of: nickel, gold, silver and titanium; and said stabilizer layer is taken from the group consisting of: chromium, iron, cobalt and nickel.

13. An electrolytic cell for producing useful excess heating of a liquid electrolyte comprising:

a non-conductive housing having an inlet and an outlet;

a first conductive foraminous grid positioned within said housing adjacent to said inlet;

a second conductive foraminous grid positioned within said housing spaced from said first conductive grid and adjacent to said outlet;

a plurality of beds of closely packed conductive microspheres positioned within said housing and extending between said first and second conductive grids in a spaced apart end-to-end arrangement;

each bed of conductive microspheres separated one from another by a foraminous non-conductive mesh disposed across one end thereof and another conductive foraminous grid disposed across another end of each said bed of conductive microspheres;

said plurality of microspheres each of substantially uniform size and density and including:

a conductive metal flash coating of uniform thickness formed by chemical combination with a cation exchange surface of a spherical cross-linked polymer microbead from a metal cation which will chemically reduce with hydrazine;

a metallic hydride forming layer of uniform thickness formed atop said flash coating, said metallic hydride forming layer combining with hydrogen or an isotope of hydrogen during operation to form a metallic hydride;

a metallic support layer of uniform thickness formed atop said metallic hydride forming layer, said support layer having a relatively high hydrogen diffusion rate and a relatively low hydride formation ratio;

means for pumping said electrolyte into said electrolytic cell through said inlet, said electrolyte exiting from said electrolytic cell through said outlet;

said electrolyte including water in solution with a conductive salt;

an electric power source having terminals operably connected to said first and second grids whereby electrical current flows between said first and second grids when said electrolyte is within said electrolytic cell, said electrolyte being heated within said housing.

14. An electrolytic cell as set forth in claim 13, wherein:

said metallic hydride forming layer is taken from the group consisting of:

palladium, lanthanum, praseodymium, cerium, titanium, zirconium, vanadium, tantalum, uranium, hafnium and thorium.

15. An electrolytic cell as set forth in claim 13, wherein each said microsphere further includes:

a metallic stabilizer layer of uniform thickness formed atop said support layer, said stabilizing layer being a transition metal capable of a relatively high rate of hydrogen diffusion and a relatively low hydride formation ratio.

16. An electrolytic cell as set forth in claim 15, wherein:

said flash coating is taken from the group consisting of: copper, palladium, nickel and titanium;

said metallic hydride forming layer is taken from the group consisting
palladium, lanthanum, praseodymium, cerium, titanium, zirconium, vanadium, tantalum, uranium, hafnium and thorium;

said support layer is taken from the group consisting of: nickel, gold, silver and titanium; and said stabilizer layer is taken from the group consisting of: chromium, iron, cobalt and nickel.

* * * * *

UNITED STATES PATENT AND TRADEMARK OFFICE
CERTIFICATE OF CORRECTION

PATENT NO. : 5,607,563
DATED : March 4, 1997
INVENTOR(S) : James A. Patterson and Dennis Cravens It is certified that error appears in the above-indentified patent and that said Letters Patent is hereby corrected as shown below:

Column 8, Line 59 replace "foreruinous" with -- foraminous --.

Column 9, Line 59, replace "and" with -- grid --.

Signed and Sealed this

Eighteenth Day of November 1997

Attest:

BRUCE LEHMAN

*Attesting Officer*  Commissioner of Patents and Trademarks